United States Patent
Huang et al.

(10) Patent No.: US 8,307,094 B2
(45) Date of Patent: Nov. 6, 2012

(54) METHOD FOR PROCESSING REGISTER REQUEST, NETWORK ELEMENT, AND COMMUNICATION SYSTEM

(75) Inventors: Ping Huang, Shanghai (CN); Zhikun Wan, Shanghai (CN); Zhiyuan Hu, Shanghai (CN); Xiaorong Jin, Shanghai (CN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/452,641

(22) PCT Filed: Jul. 20, 2007

(86) PCT No.: PCT/CN2007/002220
§ 371 (c)(1),
(2), (4) Date: Jan. 13, 2010

(87) PCT Pub. No.: WO2009/012612
PCT Pub. Date: Jan. 29, 2009

(65) Prior Publication Data
US 2010/0174819 A1    Jul. 8, 2010

(51) Int. Cl.
*G06F 15/16* (2006.01)
(52) U.S. Cl. ......... 709/227; 709/220; 709/222; 709/230
(58) Field of Classification Search .................. 709/220, 709/222, 227, 230
See application file for complete search history.

(56) References Cited

U.S. PATENT DOCUMENTS

| | | | |
|---|---|---|---|
| 7,668,145 B2* | 2/2010 | Le et al. ........................ | 370/338 |
| 2002/0151312 A1* | 10/2002 | Rosemarijn Bos et al. ... | 455/452 |
| 2004/0187021 A1 | 9/2004 | Rasanen | |
| 2004/0203760 A1* | 10/2004 | Zhang ........................... | 455/433 |
| 2005/0201357 A1* | 9/2005 | Poyhonen ..................... | 370/352 |
| 2006/0077965 A1 | 4/2006 | Garcia-Martin et al. | |
| 2006/0176876 A1 | 8/2006 | Aborn et al. | |
| 2006/0182061 A1* | 8/2006 | Naghian ........................ | 370/331 |
| 2007/0061397 A1 | 3/2007 | Gregorat et al. | |
| 2007/0094412 A1* | 4/2007 | Sollee .......................... | 709/245 |
| 2007/0097999 A1* | 5/2007 | Yan ............................... | 370/410 |
| 2008/0013533 A1* | 1/2008 | Bogineni et al. ............. | 370/389 |
| 2009/0307307 A1* | 12/2009 | Igarashi ........................ | 709/203 |

FOREIGN PATENT DOCUMENTS

| | | |
|---|---|---|
| CN | 1893391 | 1/2007 |
| EP | 1 760 986 | 3/2007 |
| WO | WO 02/09387 | 1/2002 |
| WO | WO 2006/084097 | 8/2006 |

OTHER PUBLICATIONS

International Search Report. Supplementary European Search Report dated Nov. 24, 2011.

* cited by examiner

*Primary Examiner* — Phuoc Nguyen
(74) *Attorney, Agent, or Firm* — Harness, Dickey & Pierce

(57) ABSTRACT

The invention provides a method for processing register request, network element, and a communication system. The method for processing a register request of a terminal in a communication system that comprises a first network element (GSN) for providing IP networking service to said terminal, a second network element (P-CSCF) for providing SIP proxy service to said terminal, a third network element (S-CSCF) for providing SIP subscriber service to said terminal, and a fourth network element (HSS) for storing information about said terminal including said terminal's address; wherein the communication system further comprises a fifth network element (NAPT) for translating said terminal's address in between said first network element and said second network element; said method comprise: determining whether a message issued by said terminal for said register request has undergone Network Address Port Translation; indicating an address for address verification in said message based on the determination whether said message has undergone Network Address Port Translation; and verifying the address for address verification in said message against the information stored in said fourth network element.

10 Claims, 3 Drawing Sheets

METHOD FOR PROCESSING REGISTER REQUEST, NETWORK ELEMENT, AND COMMUNICATION SYSTEM

TECHNICAL FIELD OF THE INVENTION

The present invention relates to telecommunication technology, in particular, to method for processing register request, network element, and communication system.

BACKGROUND OF THE INVENTION

In earlier implementation of IMS, in order to prevent the IMS services and/or IP address from embezzlement, Early IMS is presented. In Early IMS, The HSS has a binding between the IMSI and/or MSISDN and the IMPI and IMPU(s), and is therefore able to store the currently assigned IP address from the GGSN against the user's IMPI and/or IMPU(s). The mechanism assumes that the P-CSCF checks that the source IP address in the SIP header is the same as the source IP address in the IP header received from the UE. The assumption here, as well as for the full security solution, is that no NAPT is present between the GGSN and the P-CSCF.

But when a NAPT device is between the GGSN and P-CSCF, this mechanism is not available. Although there is no IP address theft, when signaling messages traverse the NAPT device, the source IP address and port number in network layer will be translated. When P-CSCF compares the source IP address and port number in network layer with the ones in SIP header, it will find that these two addresses are not equal, and will attach the source IP address and port number in network layer from which this request message is received in the "received" and "rport" parameter of Via header respectively. When request message is forwarded to S-CSCF, S-CSCF shall compare the IP address and port number in "received" and "rport" parameter respectively with that the ones stored in HSS. It is obvious that these two addresses are not equal, and registration is not passed. It means that Early IMS cannot distinguish between address translation and theft.

SUMMARY OF THE INVENTION

To solve the above problem in the prior art, the invention provides a method for processing register request, network element, and a communication system.

According to one aspect of the invention, there is provided a method for processing a register request of a terminal in a communication system that comprises a first network element (GSN) for providing IP networking service to said terminal, a second network element (P-CSCF) for providing SIP proxy service to said terminal, a third network element (S-CSCF) for providing SIP subscriber service to said terminal, and a fourth network element (HSS) for storing information about said terminal including said terminal's address; wherein the communication system further comprises a fifth network element (NAPT) for translating said terminal's address in between said first network element and said second network element; said method comprise: determining whether a message issued by said terminal for said register request has undergone Network Address Port Translation; indicating an address for address verification in said message based on the determination whether said message has undergone Network Address Port Translation; and verifying the address for address verification in said message against the information stored in said fourth network element.

According to another aspect of the invention, there is provided a network element for providing SIP proxy service to a terminal, comprising: a NAPT determining unit configured to determine whether a message issued by said terminal for register request has undergone Network Address Port Translation; and an address setting unit configured to indicate an address for address verification in said message based on the determination whether said message has undergone Network Address Port Translation.

According to still another aspect of the invention, there is provided a communication system comprising at least one terminal, a first network element (GSN) for providing IP networking service to said terminal, a second network element (P-CSCF) as described above, a third network element (S-CSCF) for providing SIP subscriber service to said terminal, and a fourth network element (HSS) for storing information about said terminal including said terminal's address.

BRIEF DESCRIPTION OF THE DRAWINGS

It is believed that the features, advantages and purposes of the present invention will be better understood from the following description of the detailed implementation of the present invention read in conjunction with the accompanying drawings, in which.

DETAILED DESCRIPTION OF EMBODIMENTS OF THE INVENTION

Next, various embodiments of the invention will be described in detail in conjunction with accompany drawings.

Figure 1:
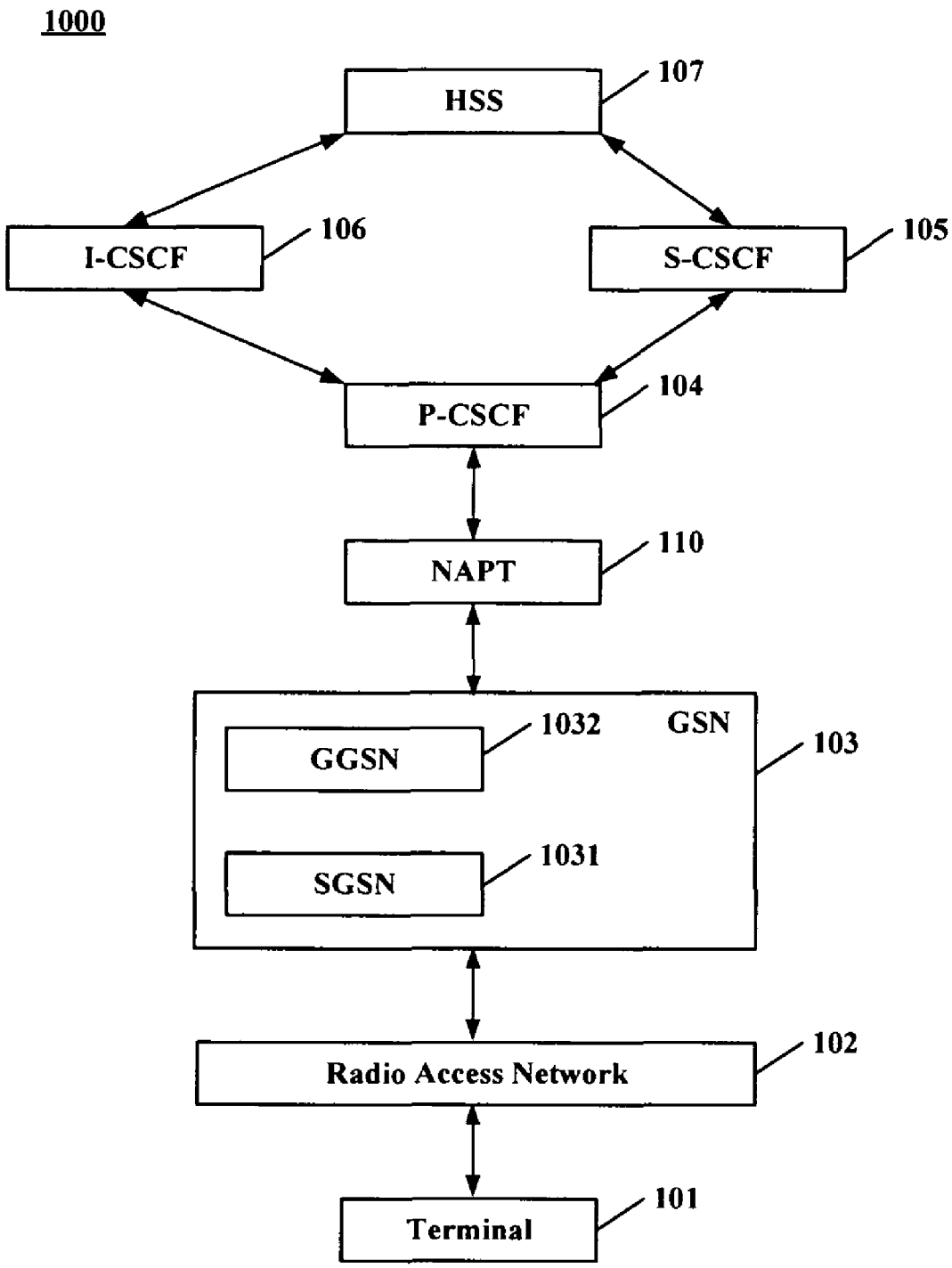
FIG. 1 depicts a schematic block diagram of the communication system in which the method for processing register request and the network element according to embodiments of the invention can be implemented.

FIG. 1 depicts a schematic block diagram of the communication system in which the method for processing register request and the network element according to embodiments of the invention can be implemented.

As shown in FIG. 1, terminal 101 (or UE) is firstly connected to radio access network 102. GSN 103 is a network element for providing IP networking service to terminal 101, in other words, connecting terminal 101 to IP network. GSN 103 typically comprises SGSN 1031 and GGSN 1032.

P-CSCF (Proxy-CSCF) 104 is a network element for providing SIP proxy service to terminals such as terminal 101. P-CSCF 104 maintains security associations with terminals and interacts with the resource management in the packet network. It also takes care of the compression of SIP messages.

S-CSCF (Serving-CSCF) 105 is a network element for providing SIP subscriber service to terminals such as terminal 101. S-CSCF 105 is charge of SIP register for registered subscribers and instructs HSS to update upon registration.

I-CSCF (Interrogating-CSCF) 105 communicates with HSS to determine the address of the S-CSCF; while HSS 107 stores the information about the terminals such as subscriber's profile including, for example, the address of terminal 101.

As described above, when there is a NAPT device 110 between GSN 103 (specifically GGSN 1032) and P-CSCF 104, the conventional Early IMS mechanism is not available. For example, when a register message of terminal 101 is undergoing Network Address Port Translation (NAPT), the source address in network layer will be translated. When P-CSCF 104 compares the source address in network layer with the one in SIP header, it will find that these two addresses are not equal, and will attach the source IP address and port number in network layer from which this request message is received in the "received" and "rport" parameter of Via header respectively. When request message is forwarded to S-CSCF 105, S-CSCF 105 shall compare the address in "received" and "rport" parameter against the terminal's address stored in HSS 107. It is obvious that these two addresses are not equal, and registration is not passed. As a result, Early IMS wrongly treats the address translation as theft.

Figure 2:
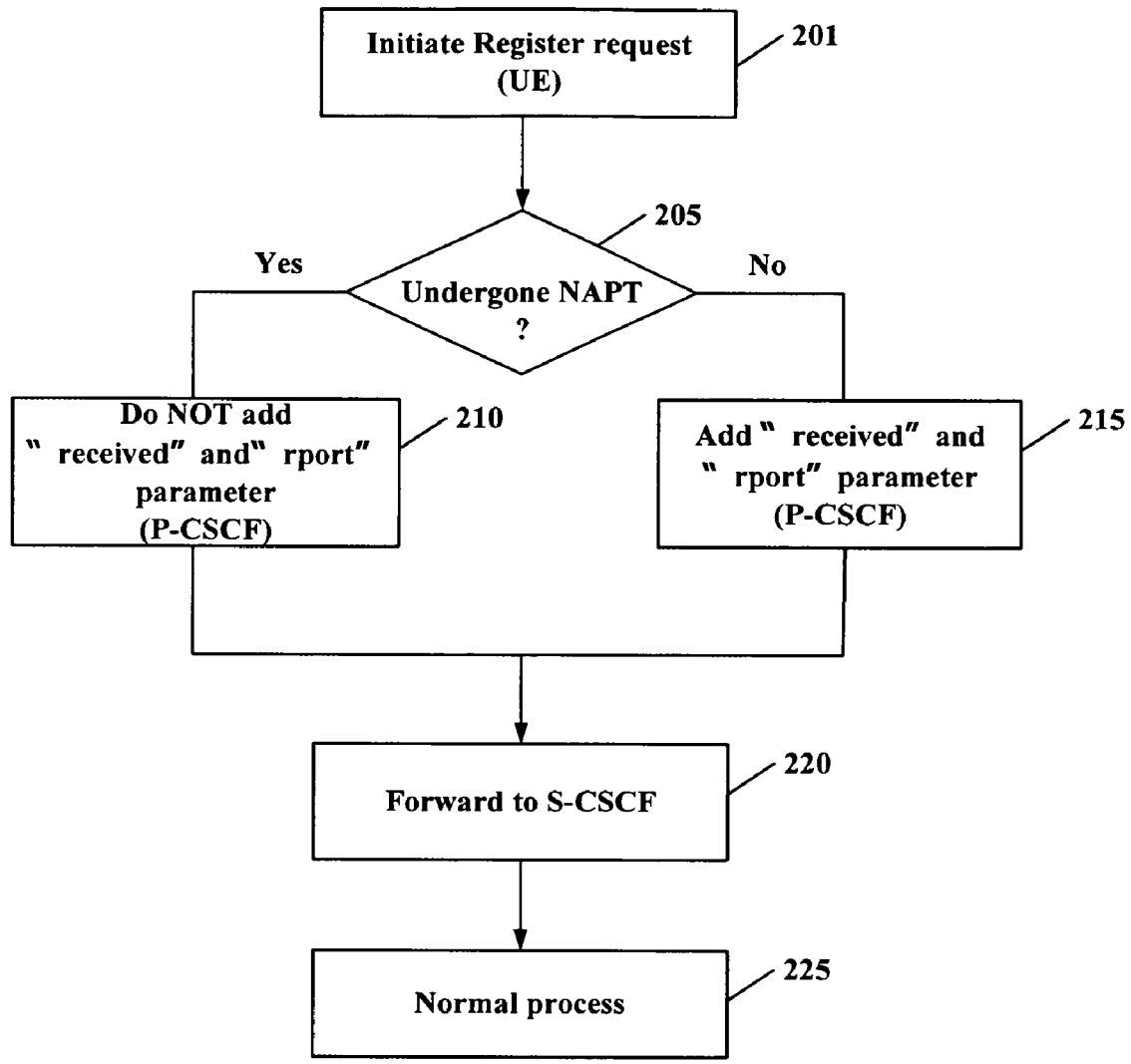
FIG. 2 depicts a flowchart of the method for processing register request according to an embodiment of the invention.

In order to solve the technical problem in the prior art, the present invention provides a method for processing register request. FIG. 2 depicts a flowchart of the method for processing register request according to an embodiment of the invention As shown in FIG. 2, firstly, a terminal such as terminal 101 initiates a register request message at step 201.

Then, it is determined whether the register request message has undergone Network Address Port Translation at step 205. More specifically, when P-CSCF such as P-CSCF 104 receives the register request message from the terminal, it shall compare the source address in network layer with the source address in SIP header (e.g. in "sent-by" parameter). If these two addresses are not equal, P-CSCF shall determine from the source address in network layer that which NAPT device the message traverses through.

If P-CSCF finds that the changed address (equal to the source address in the network layer of message received by P-CSCF) is not in any NAPT device's public IP address range, P-CSCF shall indicate the changed address as the address for address verification at step 215, for example, by attaching the source IP address and port number in network layer from which this request message is received in the "received" and "rport" parameter of Via header respectively as suggested by 3GPP 33.878.

If P-CSCF finds that the changed address is in one of NAPT devices (such as NAPT 110) public IP address range, P-CSCF can determine the NAPT device location from the changed address. P-CSCF shall be able to get the address mapping information from that NAPT device. From address mapping information, P-CSCF can know whether there is an address translation between changed address in network layer and source address in the SIP header. If the address mapping result exists, it means that the changed address is NAPTed from Source address in SIP header. Then P-CSCF shall indicate the source address in SIP header as the address for address verification at step 210, for example, by not adding "received" and "rport" parameter in Via header. Preferably, P-CSCF shall be able to store the address mapping result for later corresponding messages that traverse the same NAPT device. As a result, P-CSCF does not have to consult the NAPT device for each message that is initiated from the same terminal and traverses the same NAPT device. But the present is not limited to this point.

When S-CSCF receives the register request message, it shall check whether "received" parameter is in the Via header. If this parameter exists, the address in "received" and "rport" is compared (verified) according to 3GPP 33.878. But if "received" parameter does not exist, only the address in "sent-by" shall be compared (verified) according to 3GPP 33.878.

It can be seen from the above description that with the method for processing register request according to the embodiment, the distinction problem between address translation and theft can be resolved when NAPT is between GGSN and P-CSCF in Early IMS. There is only some little change in P-CSCF process flow, while UE and S-CSCF remain unchanged. In addition, there is no performance impact to existing Early IMS mechanism.

Figure 3:
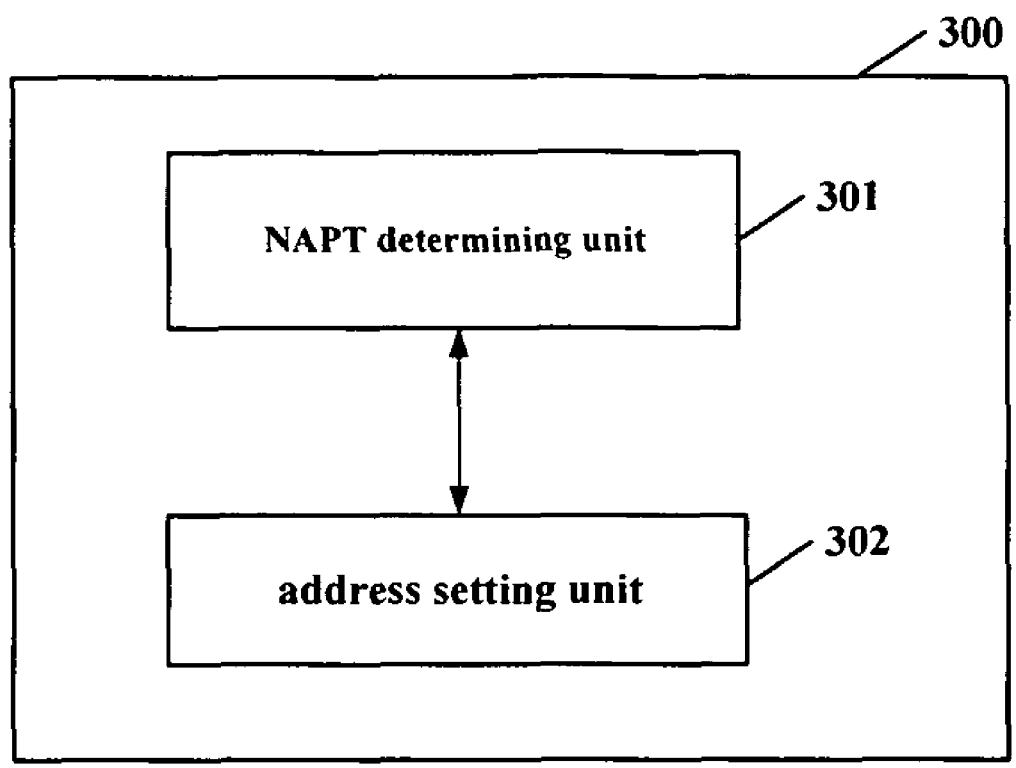
FIG. 3 depicts a schematic block diagram of the network element according to an embodiment of the invention.

Under the same inventive conception, FIG. 3 depicts a schematic block diagram of the network element according to an embodiment of the invention, which can be implemented in the communication system 1000 of FIG. 1 as P-CSCF.

As shown in FIG. 3, the network element 300 comprises: NAPT determining unit 301 configured to determine whether a message issued by a terminal for register request has undergone Network Address Port Translation; and address setting unit 302 configured to indicate an address for address verification in the message based on the determination whether the message has undergone Network Address Port Translation.

More specifically, NAPT determining unit 301 compares the source address in network layer of the IP packet containing the message with the source address in SIP header of the message, and consults a Network Address Port Translation device about whether the message has undergone Network Address Port Translation, when the source address in network layer is different from the source address in SIP header of the message.

In addition, when consulting the Network Address Port Translation device, NAPT determining unit 301 sends information including the source address in network layer and the source address in SIP header of the message to the Network Address Port Translation device, in order to find the same mapping information in the Network Address Port Translation device, and determines that the message has undergone Network Address Port Translation if the same mapping information is found in the Network Address Port Translation device.

The address setting unit indicates the source address in SIP header of the message as the address for address verification if it is determined that the message has undergone Network Address Port Translation, and indicates the source address in network layer of the IP packet containing the message as the address for address verification if it is determined that the message has not undergone Network Address Port Translation.

It can be seen from the above description that with the network element 300 as P-CSCF, the distinction problem between address translation and theft can be resolved when NAPT is between GGSN and P-CSCF in Early IMS. There is only some little change in P-CSCF process flow, while UE and S-CSCF remain unchanged. In addition, there is no performance impact to existing Early IMS mechanism.

It can be appreciated that the network elements 300, and its components can be implemented with specifically designed circuits or chips or be implemented by a computing device (information processing device) executing corresponding programs. Moreover, the respective components of the network elements 300 may be physically separated but operationally cooperated.

Under the same inventive conception, the present invention provides a communication system. According to an embodiment of the present invention, the communication system comprises: at least one terminal, a first network element (GSN) for providing IP networking service to said terminal, a second network element (P-CSCF) according to the above embodiment as described in FIG. 3, a third network element (S-CSCF) for providing SIP subscriber service to said terminal, and a fourth network element (HSS) for storing information about said terminal including said terminal's address.

In addition, the communication system can further comprise a fifth network element (NAPT) for translating said terminal's address in between said first network element and said second network element.

While the method for processing register request, network element, and communication system of the present invention have been described in detail with some exemplary embodiments, these embodiments are not exhaustive, and those skilled in the art may make various variations and modifications within the spirit and scope of the present invention. Therefore, the present invention is not limited to these embodiments; rather, the scope of the present invention is solely defined by the appended claims.

The invention claimed is:

1. A method for processing a register request of a terminal in a communication system that comprises a first network element for providing IP networking service to said terminal, a second network element for providing SIP proxy service to said terminal, a third network element for providing SIP subscriber service to said terminal, and a fourth network element for storing information about said terminal including said terminal's address; wherein the communication system further comprises a fifth network element for translating said terminal's address in between said first network element and said second network element; said method comprising:
   determining whether a message issued by said terminal for said register request has undergone Network Address Port Translation;
   indicating an address for address verification in said message based on the determination whether said message has undergone Network Address Port Translation; and
   verifying the address for address verification in said message against the information stored in said fourth network element.

2. The method for processing a register request of a terminal according to claim 1, wherein said step of determining comprises:
   comparing the source address in network layer of the IP packet containing the message with the source address in SIP header of the message; and
   determining, by querying said fifth network element, whether said message has undergone Network Address Port Translation, if the source address in the network layer is different from the source address in the SIP header of the message.

3. The method for processing a register request of a terminal according to claim 2, wherein said step of consulting comprises:
   sending information including the source address in network layer and the source address in SIP header of the message to said fifth network element, in order to find the same mapping information in said fifth network element; and
   determining said message has undergone Network Address Port Translation if the same mapping information is found in said fifth network element.

4. The method for processing a register request of a terminal according to claim 1, wherein said step of indicating comprises:
   indicating the source address in SIP header of the message as the address for address verification if it is determined that said message has undergone Network Address Port Translation; and
   indicating the source address in network layer of the IP packet containing the message as the address for address verification if it is determined that said message has not undergone Network Address Port Translation.

5. A network element for providing SIP proxy service to a terminal, comprising:
   a NAPT determining unit configured to determine whether a message issued by said terminal for register request has undergone Network Address Port Translation; and
   an address setting unit configured to indicate an address for address verification in said message based on the determination whether said message has undergone Network Address Port Translation.

6. The network element according to claim 5, wherein said NAPT determining unit is further configured to compare the source address in the network layer of the IP packet containing the message with the source address in the SIP header of the message, and query a Network Address Port Translation device as to whether said message has undergone Network Address Port Translation, if the source address in network layer is different from the source address in SIP header of the message.

7. The network element according to claim 6, wherein said NAPT determining unit is further configured to send information including the source address in network layer and the source address in SIP header of the message to said Network Address Port Translation device, in order to find the same mapping information in said Network Address Port Translation device, and determine said message has undergone Network Address Port Translation if the same mapping information is found in said Network Address Port Translation device.

8. The network element according to claim 5, wherein said address setting unit is further configured to indicate the source address in SIP header of the message as the address for address verification if it is determined that said message has undergone Network Address Port Translation, and indicate the source address in network layer of the IP packet containing the message as the address for address verification if it is determined that said message has not undergone Network Address Port Translation.

9. A communication system comprising at least one terminal, a first network element for providing IP networking service to said terminal, a second network element according to claim 5, a third network element for providing SIP subscriber service to said terminal, and a fourth network element for storing information about said terminal including said terminal's address.

10. The communication system according to claim 9, further comprising: a fifth network element for translating said terminal's address in between said first network element and said second network element.

* * * * *